United States Patent
Patino et al.

(10) Patent No.: US 6,789,205 B1
(45) Date of Patent: Sep. 7, 2004

(54) SYSTEM FOR DETERMINING INTRINSIC SAFETY STATUS OF THE COMBINATION OF A COMMUNICATION DEVICE AND A BATTERY

(75) Inventors: Joseph Patino, Pembroke Pines, FL (US); Sandy L. Florence, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/573,975

(22) Filed: May 19, 2000

(51) Int. Cl.$^7$ ................................ G06F 1/26; H02J 7/00
(52) U.S. Cl. .................................. 713/300; 320/106
(58) Field of Search ................................ 713/300; 320/15, 320/31, 106, 127

(56) References Cited

U.S. PATENT DOCUMENTS

| | | | |
|---|---|---|---|
| 4,006,396 A | | 2/1977 | Bogut ........................... 320/35 |
| 5,164,652 A | | 11/1992 | Johnson et al. ................ 320/2 |
| 5,335,133 A | | 8/1994 | Bishop et al. ................. 361/56 |
| 5,411,816 A | * | 5/1995 | Patino ........................... 429/7 |
| 5,469,002 A | * | 11/1995 | Garrett ........................ 307/150 |
| 5,576,610 A | * | 11/1996 | Patino et al. ................. 320/31 |
| 5,608,306 A | * | 3/1997 | Rybeck et al. ................ 320/15 |
| 5,990,659 A | * | 11/1999 | Frannhagen ................. 320/106 |
| 6,166,522 A | * | 12/2000 | Patino et al. ................. 320/127 |

OTHER PUBLICATIONS

"Information Note on Intrinsic Safety and the Approvals held for the m–Comm System", May 16, 1999.*
"Intelligent Battery Recondition Software: Read Me" Apple Computer, AppleCare Tech Info Library, Article ID #18489, created Aug. 28, 1995, modified Aug. 10, 1999. Website: http://til.info.apple.com/techinfo.nsf/artnum/n18498.

* cited by examiner

Primary Examiner—Thomas Lee
Assistant Examiner—Chun Cao
(74) Attorney, Agent, or Firm—Scott M. Garrett

(57) ABSTRACT

A communication device (11) is provided with a microprocessor (15) and a memory storage device (13). A battery (14) associated with the communication device 11 is provided with memory 16. The memory storage device and the memory contain values relevant to the manufacturing of each device, respectively. The microprocessor reads the memory storage device and the memory and makes a determination of whether the communication device, the battery, and the combination thereof are intrinsically safe to be used in a hazardous environment, and presents the results to a user.

13 Claims, 2 Drawing Sheets

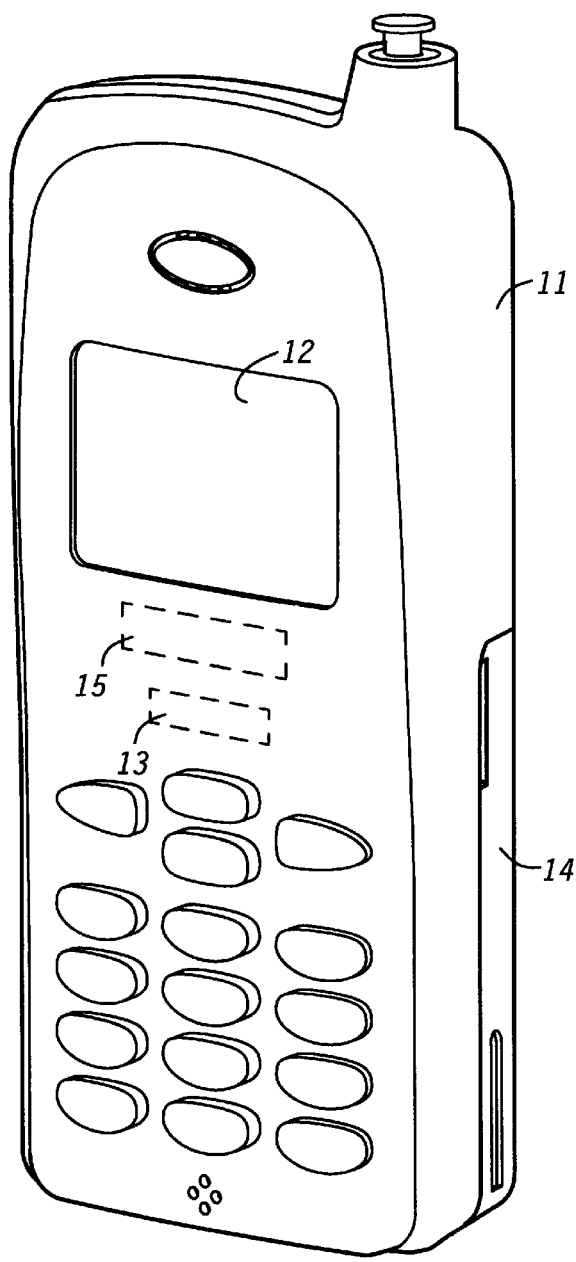
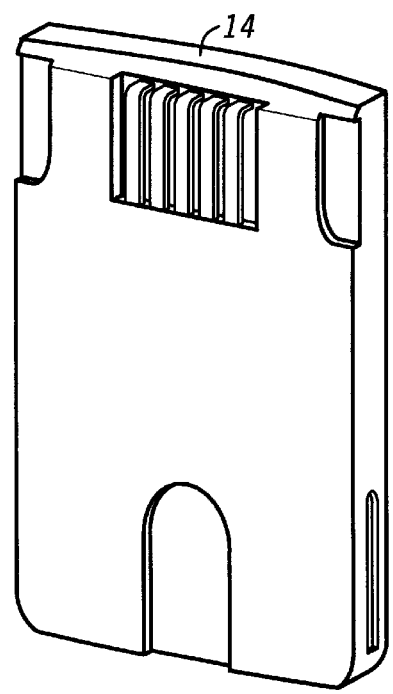
*FIG. 1*  *FIG. 2*

SYSTEM FOR DETERMINING INTRINSIC SAFETY STATUS OF THE COMBINATION OF A COMMUNICATION DEVICE AND A BATTERY

BACKGROUND OF THE INVENTION

1. Field of the Invention

This invention relates in general to the field of portable communication apparatus and in particular to methods and apparatus adaptable to portable communication devices to provide knowledge to a user as to whether the devices are intrinsically safe for operation in a hazardous environment.

2. Description of the Prior Art

There are many locations, structures, or buildings where a spark from an electrical device could result in an explosion and/or a fire. Usually, such areas are filled with air and a combustible vapor or dust such that the air molecules completely surround the particles of combustible material. The presence of the surrounding air provides an atmosphere which is highly combustible because of the oxidizing effect of the oxygen in the air. An electrical spark in such an environment could, therefore, cause rapid combustion resulting in an explosion.

To lessen the changes of creating an explosion in a vapor or dust-laden atmosphere, intrinsically safe electronic devices have been developed where sparking is substantially or completely eliminated from the connection, operation and disconnection of the electrical devices. Industry standards have been developed so as to define the parameters of an intrinsically safe device throughout the many fields of industry in order to ensure the prevention of an explosion.

Due to rapid advances in technology, many new portable devices in general and portable communication devices in particular are being developed, sold and used. Since portable communication devices necessarily use a battery or batteries for operation, there exists the possibility of a spark being generated when the battery or batteries are removed and replaced. For the most part, the intrinsically safe standards have been applied to portable communication devices and an end user can obtain an intrinsically safe product which can be safely used in a hazardous environment.

In the prior art, some manufacturers label their batteries with a notice stating that the battery is intrinsically safe. On the other hand, other manufacturers might not so label the batteries. Then too, the label on a properly labeled battery may fall off or be taken off so that a user of the communication device can not know or verify whether the battery is intrinsically safe.

In some communication devices having a display screen, an electronic message indicates that the device is intrinsically safe. With these types of devices, an included electronically programmable read only memory chip (EPROM) is preprogrammed to indicate to the user that the device is intrinsically safe or includes an intrinsically safe option. In this manner, a person who is not the original purchaser and does not know that the intrinsically safe option is included with the device may read such information on the display screen of the device.

However, there are occasions in the prior art where an intrinsically safe device has lost this option. For example, the battery which originally came with the device and which is intrinsically safe may have inadvertently been replaced with a battery that does not have this option. A subsequent user would be reading the display screen believing that the device is fully intrinsically safe whereas only the device itself and not the battery is intrinsically safe. Obviously, this could result in a very dangerous situation. While two-way radios are particularly susceptible to being used with a battery which is not intrinsically safe, there exist many other electronic devices, such as cell phones, pagers, wireless accessories, and the like which are potentially dangerous to use in a hazardous environment.

What is needed is a technique which will inform a user whether an electronic device and the battery associated therewith are each intrinsically safe to be used in a hazardous environment.

SUMMARY OF THE INVENTION

The present invention accomplishes the above-stated primary objective and overcomes the aforestated prior art problems by providing simple but effective methods and apparatus for determining whether a device and the battery or batteries associated with a battery operated device are each intrinsically safe as may be determined by a fair reading and interpretation of the entire specification herein.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective view of one type of host communication device containing an intrinsically safe option;

FIG. 2 is perspective view of a typical battery used in the host device of FIG. 1.

DESCRIPTION OF THE PREFERRED EMBODIMENTS

Figure 3:
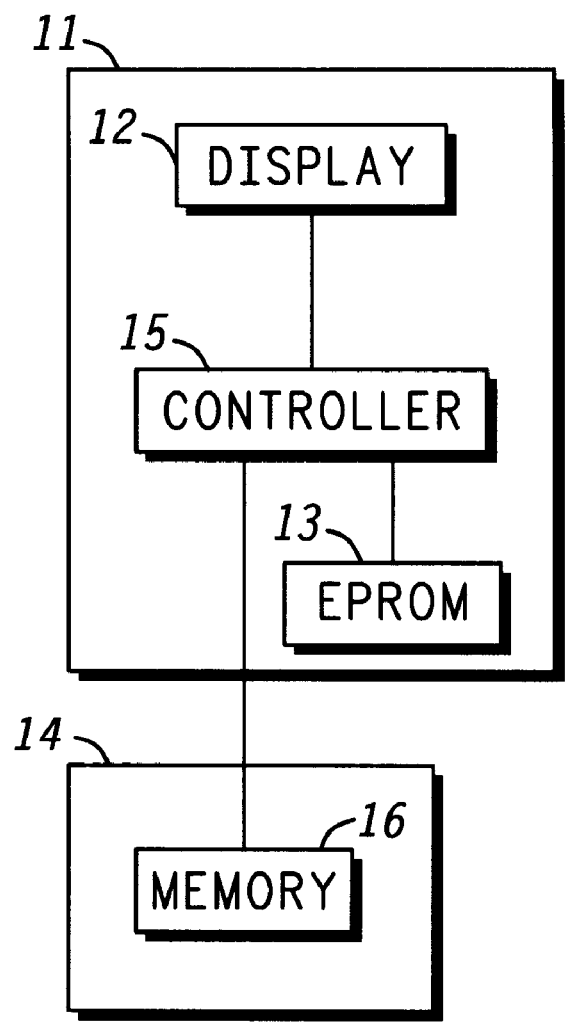
FIG. 3 is a block diagram of the apparatus and methods according to the present invention for use in such devices as shown in FIGS. 1 and 2.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and words used herein are not to be considered limiting; but rather merely descriptive.

An intrinsically safe option of a communication device typically indicates is that the host device and the battery are of a type which are approved by a safety agency for use in a hazardous environment. That is, that operation of the battery-powered device will not produce a spark even when the battery is removed and replaced and, therefore, will not cause an explosion or fire in an environment conducive to the same. An intrinsically safe option is, therefore, an option purchased or initially included within the host device when purchased. All two-way radios and other battery operated electronic devices do not necessarily include the intrinsically safe option. The present invention is, however, limited to devices which have the intrinsically safe option or are converted to become intrinsically safe.

Reference is now made to the drawings, wherein like characteristics and features of the present invention shown in the various figures are designated by the same reference numerals.

Reference is now made to the communication device 11 depicted in FIG. 1 which, for purposes of the explanation and description which follows, will be termed a "host communication device." Thus, the present invention is not limited to particular radio communication device 11 depicted in FIG. 1. The present invention may be used with any communication device which contains or is powered by a battery. Thus, for example, a portable or laptop computer, or any transportable radio would fall within the type of communication devices to which the present invention may be applied.

The host communication device 11 typically uses a battery as shown in FIG. 2 for its operation. A display screen 12, in the example shown, is associated with the host communication device 11. An electronic, programmable read only memory chip (EPROM) 13 is provided, such as found within many modern-day host communication devices. However, in this regard, the use herein of the acronym EPROM is not intended to be limiting, but rather as a designation for a memory device which contains data capable of being accessed. The EPROM 13 is preprogrammed by the manufacturer to include a number of different operating parameters and/or operating characteristics of the host device 11. A microprocessor or controller 15 is provided within the host electronic device 11. The microprocessor 15 and the EPROM 13 are electronically connected such that the microprocessor reads the information stored in the EPROM 13. Since the host device of FIG. 1 includes a display screen 12, the data read by the microprocessor 15 is displayed on the screen 12. A screen is preferable because of the its ability to display more than a yes or no response as compared to an indicator light. For example, battery life information is usually displayed in bar graph form so that the user can determine the remaining life of the battery 14 as a percentage of the total life or charge. Knowing how much remaining life is in the battery is obviously more useful than a light emitting diode (LED) indicator light which signals only when the battery is discharged. The same is true with the information stored in the EPROM 13 and read by the microprocessor 15. However, while an LED indicator has its limitations, it still provides useful information and can be used with the EPROM 13 and microprocessor 15 in lieu of or in conjunction with the display screen 12. Yet another approach for presenting the intrinsic safety status to a user is by the use of an audible alert. This approach can be used in addition to or in lieu of visible indicators such as the display screen 12 or an indicator.

The battery 14 depicted in FIG. 2 is, according to the present invention, also provided with a programmable memory 16 (FIG. 3). Memory 16 has a value or values that can be read by the communication device 11. The memory 16 can be implemented, for example, as a digital memory, such as an electronically programmable read only memory (EPROM), or a resistor of a selected value (a "coding resistor"). Memory 16 is selected or programmed by the manufacturer with a value or values that indicate various pertinent data of the battery 14 such as whether it is intrinsically safe and or other data such as model number, batch number, serial number, plant location, operating voltage, amperage rating and any other information relating to the manufacturing history, specifications and operating characteristics of the battery. Memory 16 is compatible with and capable of being read or otherwise accessed by the microprocessor 15 in host communication device 11.

Attention is now directed to FIG. 3 of the drawings which details one embodiment of the present invention. In FIG. 3, the host device 11 is shown as a battery operated electronic device. Included within the electronics of the host device 11 is a controller or microprocessor 15 which, in general, provides the host device 11 with the means necessary to operate. An EPROM 13 is provided within the host device 11 which is shown to input information into the controller 15 which may be a microprocessor, and which is then displayed on the display screen 12.

It will be appreciated that the EPROM 13 can alternately be included as a part of the controller or microprocessor 15.

According to the present invention the memory 16 is provided within the battery 14. When the battery is connected to the host device 11, the battery memory 16 is coupled to the controller 15 of the host device 11. The controller 15 reads and processes the value or values, and determines if the battery 14 is of the intrinsically safe type. In this regard, the EPROM 13 is preprogrammed with battery data for one or more batteries that are intrinsically safe batteries. This battery data allows the controller 15 to compare the value or values received from the battery EPROM 16 with the data stored in the EPROM 13 and make the determination that the battery 14 is or is not intrinsically safe.

The host device 11 has now determined that both it 11 and the battery 14 are each intrinsically safe and displays this information to the user. Such information is preferably displayed as a warning each time the host device is turned on. While the user has been so informed, the present invention contemplates, in a further embodiment, and as an added safety feature, a determination of whether the host device 11 and the battery 14 as a particular combination is intrinsically safe. In order to make this determination, the controller or microprocessor 15 compares the particular combination of the host device and the battery to combination data stored within the EPROM 13.

In this fashion, an end user can quickly determine whether or not the host device 11 and the battery 14 are each intrinsically safe and can determine whether the particular combination of communication device 11 and battery 14 is safe to use without having to verify the history of the communication device 11, the battery, or the combination thereof. The end user will not need to be concerned with whether the certification label has been inadvertently removed from the battery or not placed on the battery.

In another embodiment, instead of showing the intrinsic safety status on the display 12, or after showing the status on the display for a short while, the microprocessor shuts the communication device off, or alternatively disables certain higher risk functions, such as transmitting.

The information supplied by the memory 16 of battery 14 to the controller 15 need not be of any specific type, provided that the controller sufficiently identifies the history of the battery 14. For example, the battery need only provide its model number which the controller 16 can compare to information stored within it to determine whether or not that model is intrinsically safe. One skilled in the art can readily envision other battery information supplied to the controller 16, allowing the controller 16 to make the necessary determination.

The present invention thus provides methods and apparatus which provide an end user having no specific knowledge of the history of either the battery 14 or the host device 11 to make a quick and positive determination of whether the combination is safe to use in a hazardous environment.

As noted above, the invention may be advantageously used with any electronic device utilizing a battery anywhere in its system and is, therefore, not to be restricted to any particular communication device. For example, it is within the contemplation of the present invention to provide a back-up battery within an electronic device, wireless or otherwise, with a memory storage device capable of being read by a microprocessor in the electronic device and outputting information concerning the intrinsically safe combination.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

What is claimed is:

1. Electronic apparatus comprising:
   a host electronic device including a memory storage device, a microprocessor and means to display information;
   a battery adapted to be used with said host device, a memory in said battery providing at least one intrinsic safety value; and
   said at least one intrinsic safety value being readable by said microprocessor; and
   an intrinsic safety status of the combination of the host electronic device and battery being determined by said microprocessor by comparing said at least one intrinsic safety value with data stored in said microprocessor and displayed by said display means.

2. The apparatus of claim 1 wherein said host electronic device comprises a wireless communication device.

3. The apparatus of claim 1 wherein said battery comprises a power source for operating said host electronic device.

4. The apparatus of claim 1 wherein said memory in said battery comprises an EPROM.

5. The apparatus of claim 1 wherein memory in said battery comprises a resistor.

6. The apparatus of claim 2 wherein said wireless communication device comprises a radio.

7. A method for determining whether an electronic device and a battery associated therewith are intrinsically safe in combination, comprising the steps of:

providing said electronic device with a memory storage device, a microprocessor and display means;
providing said battery with a memory;
providing said memory with at least one value indicating manufacturing data of said battery;
reading said at least one value by said microprocessor; and
determining whether said battery is intrinsically safe in combination with said electronic device by comparing said at least one value with data stored in said microprocessor.

8. A host electronic device comprising:
   a memory storage device;
   a microprocessor;
   a presentation device; and
   where the microprocessor is programmed to:
      read intrinsic safety data stored in a battery when the battery is installed to the host electronic device;
      make an intrinsic safety determination of the combination of the host electronic device and the battery by comparing the intrinsic safety data with data stored in said microprocessor; and
      display a result of the intrinsic safety determination on the presentation device.

9. The host electronic device according to claim 8, wherein the microprocessor is further programmed to use the presentation device to convey the determination.

10. The host electronic device according to claim 8, wherein the microprocessor is further programmed to shut off high risk functions of the host electronic device when the determination is that the battery is not intrinsically safe.

11. The host electronic device according to claim 8, wherein the microprocessor is further programmed to shut off high risk functions of the host electronic device when the determination is that a combination of the battery and the host electronic device is not intrinsically safe.

12. The host electronic device according to claim 8, wherein the presentation device is one of a display, an indicator, or an audible indication.

13. The host electronic device according to claim 9, wherein the intrinsic safety determination is made when the host electronic device is turned on.

* * * * *